(No Model.)
C. G. DAVIS.
INSECT POWDER OR SAND SPRAYER.
No. 515,519.  Patented Feb. 27, 1894.
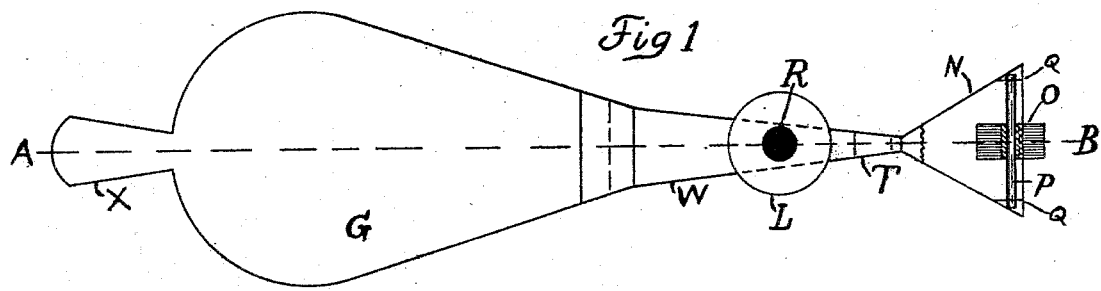
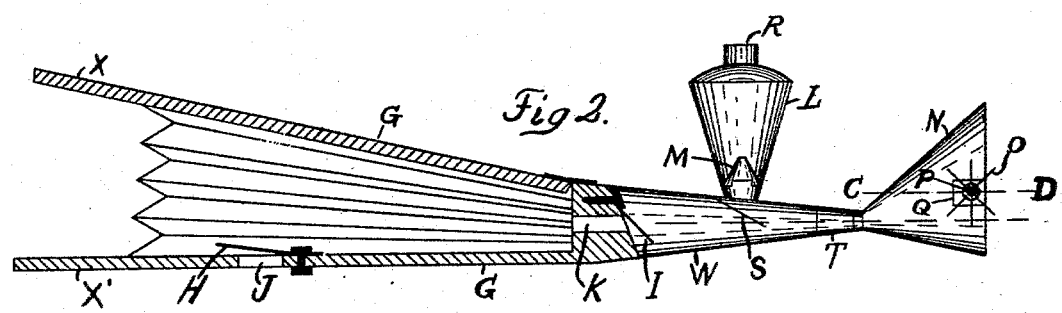
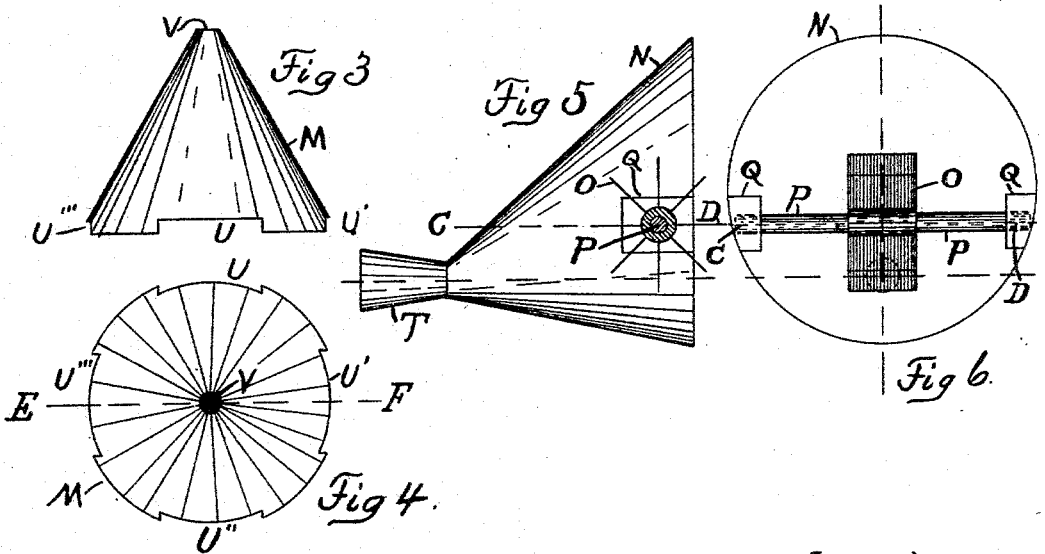
Witnesses.
Richard L. Frost,
James S. Madison
Inventor.
Cleveland G. Davis
By Frank E. Withey
Atty.

UNITED STATES PATENT OFFICE.

CLEVELAND G. DAVIS, OF MANISTEE, MICHIGAN.

INSECT-POWDER AND SAND SPRAYER.

SPECIFICATION forming part of Letters Patent No. 515,519, dated February 27, 1894.

Application filed April 18, 1893. Serial No. 470,860. (No model.)

*To all whom it may concern:*

Be it known that I, CLEVELAND G. DAVIS, of the city of Manistee, county of Manistee, and State of Michigan, have invented certain new and useful Improvements in Insect Powder and Sand Sprayers, of which the following is a specification.

My invention relates generally to that class of insect powder and sand sprayers, in which is employed a bellows for propelling or forcing the insect powder or sand to its desired destination.

To the upper side of the exit pipe of the bellows is attached a reservoir for the temporary storage of the insect powder or sand. To the end of the exit pipe is also attached a funnel or bell shaped mouth piece, in which is suitably journaled a fan wheel for the purpose of spraying the insect powder or sand, evenly.

A further object of my invention is to provide a means of preventing the insect powder or sand from feeding or flowing into the bellows exit pipe too fast, and this is accomplished by placing a small, inverted funnel in the bottom portion of the reservoir. Said small inverted funnel has small openings in it, through which the insect powder or sand passes to the exit pipe of the bellows. I attain these objects, by the mechanism illustrated in the accompanying drawings in which—

Figure 1 is a plan or top view of the entire machine, with the funnel or bell shaped mouth piece in section on the line C. D. of Figs. 2, 5 and 6. Fig. 2, is a vertical, longitudinal sectional view of Fig. 1, on the line A. B. Fig. 3 is a vertical sectional view of the small inverted funnel on the line E. F. of Fig. 4. Fig. 4 is a bottom plan of Fig. 3, and looking upward. Fig. 5 is an enlarged vertical longitudinal sectional view of the funnel or bell shaped mouth piece. Fig. 6 is a vertical end view of Fig. 5, and looking to the left.

Similar letters refer to similar parts throughout the several views.

G, in Figs. 1 and 2, is an ordinary bellows.

H, is the air admission valve in the bellows, and I is the delivery valve.

J, is the air admission opening to the bellows, and K is the exit opening.

L, is the reservoir in which the insect powder or sand is temporarily stored.

M, is the small inverted funnel, used to prevent the insect powder or sand from feeding too fast into the exit pipe of the bellows.

N, is the funnel or bell shaped mouth piece, which is attached to the end of the exit pipe.

O, is the fan wheel, used to spray the insect powder or sand.

P, is a shaft upon which is mounted the fan wheel O, the ends of which are journaled in the bearings, Q. Said bearings Q, are attached to the side walls of the funnel or bell shaped mouth piece, N.

R, is the opening in the top of the reservoir, for the purpose of filling said reservoir.

S, is a shield to prevent the air from the bellows, or a portion of it, from flowing into the reservoir and thereby creating an abnormal action.

T, is a tube, tapering, and made to fit over the end of the exit pipe of the bellows.

U, U', U'', U''', are small openings in the lower portion of the small inverted funnel, M, through which the insect powder or sand passes, just before it enters the exit pipe of the bellows.

V, is a opening in the upper portion of the small inverted funnel M, also, through which the insect powder or sand passes just before it enters the said exit pipe.

W, is the exit pipe of the bellows, G.

The center of the fan wheel O, is placed sufficiently above the center line of the opening of the exit pipe W, so that the air in issuing from the opening of the exit pipe W, will strike against the lower ends of the paddles of the fan wheel O, and cause it to revolve in proportion to the velocity of the said air, as it issues from the said opening of the exit pipe W.

X and X' are handles of the bellows, G.

The operation of my invention is as follows, to wit: By working the handles, X and X', of the bellows, G, back and forth in an ordinary manner, and thus causing the air, as the handles X and X' are separated, to enter the bellows G, through the opening J, and thus in turn, as the handles X and X' are brought together, which closes the bellows, to force the air contained within said bellows to be driven out through the exit opening K, into the exit pipe W, and on through said pipe W, until it finally strikes against the lower portion of the paddles of the fan wheel O, which causes the said fan wheel O, to revolve, and at a velocity in proportion to the velocity with which the handles X and X' are reciprocated. The reservoir L, being filled with insect powder or sand or other substance that is to be sprayed, it is drawn into the exit pipe W, partly by gravity, but mainly by the current of air passing through the exit pipe W, and thus mixes or mingles with the said air and travels with the said air, until the air and insect powder or other substance strikes against the revolving fan wheel, which by its revolving velocity, causes a secondary vibration of the air, which in turn, completely sprays or scatters the insect powder or other substance.

The funnel or bell shaped mouth piece, as shown in Figs. 5 and 6, may be attached to any ordinary bellows that has a reservoir for holding insect powder, sand or other substance to be sprayed upon vegetation to kill insects, or for sanding any kind of painted work to make it represent stone, &c.

Having fully described my invention, what I claim, and desire to secure by Letters Patent, is—

1. In a sprayer, the combination of the funnel or bell shaped mouth piece N, with the fan wheel O, securely fastened to the shaft P, and the shaft P, suitably journaled in the said funnel or bell shaped mouth piece N, all substantially as shown and described, and for the object set forth.

2. In a sprayer, the combination of the reservoir L, attached to the exit pipe of an ordinary bellows, with the small inverted funnel M, attached to the reservoir L, all substantially as shown and described, and for the object set forth.

3. In a funnel or bell shaped mouth piece, the combination of the fan wheel O, and the shaft P, properly journaled in the said funnel or bell shaped mouth piece N, and said fan wheel O, and shaft P, so situated in said funnel or bell shaped mouth piece, as to be revolved by the current of air, that issues from the said bellows, all substantially as shown and described, and for the object set forth.

In witness whereof I have hereunto signed my name in the presence of two witnesses.

CLEVELAND G. DAVIS.

In presence of—
GEO. M. BURR,
RICHARD L. FROST.